United States Patent [19]
Schonstedt

[11] 3,757,209
[45] Sept. 4, 1973

[54] COMPENSATION FOR MISALIGNMENT OF MAGNETIC SENSORS

[76] Inventor: Erick O. Schonstedt, 1775 Wiehle Ave., Reston, Va. 22070

[22] Filed: Feb. 11, 1972

[21] Appl. No.: 225,454

[52] U.S. Cl. .............................. 324/43 G, 324/43 R
[51] Int. Cl. ............................................ G01r 33/02
[58] Field of Search .................. 324/43 G, 43 R, 41

[56] References Cited
UNITED STATES PATENTS
2,966,853  1/1961  Gilfillan, Jr. et al. ............. 324/43 G
3,487,459  12/1969  Schonstedt ........................ 324/43 R

*Primary Examiner*—Robert J. Corcoran
*Attorney*—Shapiro & Shapiro

[57] ABSTRACT

Magnetic locator or gradiometer of the fluxgate type comprising an elongated non-magnetic cylindrical tube with a pair of directional magnetic field sensor means spaced apart in and fixed to the tube, the sensor means having individual magnetic axes approximately aligned with the longitudinal axis of the tube, and comprising means for compensating for misalignment of the axis of either of the sensor means with the longitudinal axis. The compensating means may comprise a non-magnetic annulus having an opening through which the elongated tube extends freely and slidably longitudinally and circumferentially, the annulus carrying a body of easily magnetizable material and having a set screw for fixing its position upon the tube after the annulus has been moved longitudinally along the tube and circumferentially of the tube to a position at which substantial compensation for misalignment is attained. Alternatively, the compensating means may comprise a non-magnetic cylindrical cap closing one end of the tube and rotatably adjustable about the longitudinal axis, the cap carrying a body of easily magnetizable material eccentrically thereon and having means for fixing the cap to the tube after the cap has been rotated about the longitudinal axis to a position at which substantial compensation for misalignment is attained.

6 Claims, 7 Drawing Figures

PATENTED SEP 4 1973 3,757,209

COMPENSATION FOR MISALIGNMENT OF MAGNETIC SENSORS

BACKGROUND OF THE INVENTION

This invention relates to apparatus for measuring or sensing magnetic pnenomena, such as magnetic fields, objects, or disturbances, and is more particularly concerned with a magnetic locator or gradiometer incorporating mechanically adjustable magnetic compensation for misalignment of the axes of the magnetic sensor elements.

Saturable core (fluxgate) magnetic locators or gradiometers comprise at least two electrically matched field-sensing elements mounted on a non-magnetic structure such that their magnetic axes are, theoretically, precisely parallel or coaxial. The output signals of the two sensors are arranged such that they oppose each other. If the structure is oriented in any direction in a uniform magnetic field, the components of magnetic field existing at each sensor are equal, so that there is no resulting output signal from the combination of the two sensors.

If a magnetic object exists within the detection range of the instrument, the magnetic field will generally be stronger at one of the sensors than at the other sensor. As a result, the output signal of one sensor will be greater than that of the other, so a net difference signal will be produced that is indicative of the presence of the object.

For accuracy of operation, the magnetic axes of the two sensors must be precisely aligned. The precision required is of the order of three seconds of arc if the error signal due to misalignment of the magnetic axes is to be less than 1 gamma ($10^{-5}$ gauss) in an ambient magnetic field of 60,000 gammas. If the magnetic axes of the two sensors are not precisely aligned, the component of the ambient magnetic field existing along the magnetic axis of one sensor will not be the same as the component of the magnetic field existing along the magnetic axis of the other sensor. The difference between the two sensor signals will not be zero, and a false signal will be obtained due to the mechanical misalignment.

In certain prior art fluxgate gradiometers aligment has been achieved by mechanical adjustment or bending of structural members, such as a sube in which the sensors are mounted. See, for example, the applican's prior U.S. Pat. No. 3,050,679, issued Aug. 21, 1962. The bending of the tube places the tube under stress. In time, the stress may be relieved and the sensors may become misaligned, resulting in accuracy and the need for readjustment.

The applicant's prior U.S. Pat. No. 3,488,579, granted Jan. 6, 1970, discloses a system by which compensation for misalignment is produced electrically. While this system is capable of compensating for misalignment with high precision, its cost may be higher than is justified when such high accuracy is not required.

It has heretofore been proposed to provide bodies of easily magnetizable material adjacent to gradiometers for compensating for extraneous magnetic effects and misaligned cores. See, for example, U.S. Pat. No. 2,966,853, granted Jan. 3, 1961 to Gilfillan et al.; U.S. Pat. No. 3,012,191, granted Dec. 5, 1961 to Miller et al.; and U.S. Pat. No. 2,976,483, granted Mar. 21, 1961 to Moore et al. However, such schemes for compensating for extraneous effects and misaligned cores have been capable of minimal adjustment and limited flexibility, and have required the attachement of additional elements to the sensor cores themselves with commensurate complexity and susceptability to errors resulting from core stresses. The applicant's prior U.S. Pat. No. 3,487,459, granted Dec. 30, 1969, discloses an improved mechanically adjustable compensator which avoids such problems.

BRIEF SUMMARY OF THE INVENTION

A principal object of the present invention is to provide modified and improved mechanically adjustable compensation for sensor misalignment in a magnetic locator or gradiometer or the like, with particular reference to practical, portable apparatus.

Another object of the invention is to provide apparatus of the foregoing type which avoids stressing of the magnetic cores or a support structure therefor and which provides compensating elements of nominal fixed size, the positions of which are easily adjusted.

Briefly stated, the present invention is based upon the concept of providing bodies of easily magnetizable material mounted upon a non-magnetic support which contains the magnetic sensors. The bodies may be elongated rods or slugs oriented transversely to the magnetic axes of the sensors and carried by non-magnetic members which may be readily adjusted relative to the sensor support and then fixed in position very simply.

BRIEF DESCRIPTION OF THE DRAWINGS

The invention will be further described in conjunction with the accompanying drawings, which illustrate preferred and exemplary embodiments, and wherein.

DETAILED DESCRIPTION OF THE INVENTION

Figure 1:
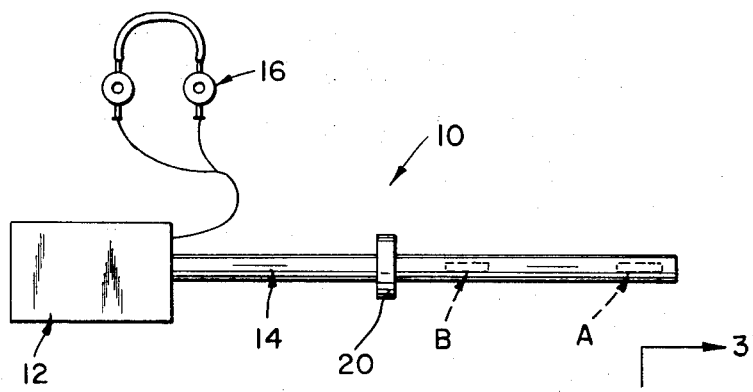
FIG. 1 is a plan view of a first embodiment of apparatus in accordance with the invention.

Referring to FIG. 1, reference numeral 10 designates magnetic sensing or detecting apparatus, such as a magnetic locator, employing compensating means in accordance with the invention. The locator, which may be employed for locating hidden utility pipes, surveyor's benchmarks, etc., comprises a cylindrical case 12, containing electronics, and a non-magnetic sensor-containing tube 14 extending from the case 12. The entire apparatus is easily portable. In use, the free end of tube 14 may be swept back and forth along the ground in a scanning movement. A distinctive signal is produced in the earphones 16 when a magnetic object is located.

The tube 14, which is formed of a non-magnetic material such as aluminum, for example, contains the magnetic field sensors A and B. Sensors of the fluxgate type suitable for use in the invention are disclosed, for example, in the applicant's prior U.S. Pat. No. 2,981,885, issued Apr. 25, 1961. The sensors per se and the electronics in association therewith are well known in the prior art. A suitable sensor may comprise a tubular magnetic core having excitation windings wound longitudinally through the core and having pick-up windings wound circumferentially about the core. In operation, the excitation windings are supplied with alternating current by an oscillator. Second harmonic fluxes generated in the sensor cores due to the effect of an external magnetic field acting along the core axes ( parallel to the length of the cores ) cut the pick-up windings and generate second harmonic output voltages therein. The output voltages from the sensors are applied differentially to suitable measuring apparatus, so that if the sensors are matched and their axes are perfectly aligned, the meter will read zero in a uniform field. If, however, there is misalignment of one of the core axes, an error signal will be generated due to the misalignment.

The present invention is not concerned with the precise manner of mounting the sensor cores and the windings thereof, nor with the precise manner in which the signals from the fluxgate sensors are detected. It will be apparent, however, to those skilled in the art that the sensors A and B may be mounted substantially coaxially upon a ceramic tube, as described in the aforesaid U.S. Pat. No. 3,487,459, which may then be press fit into the tube 14 of FIG. 1, wires from the respective sensors passing through tube 14 into the case 12, containing the oscillator, amplifier, etc.

To obtain exact alignment of the longitudinal axes of the cores of sensors A and B is an expensive and tedious proposition. Moreover, despite the best efforts to obtain precise alignment, there will usually be sufficient misalignment to require compensation. In accordance with the present invention, compensation for misalignment is provided by mechanically adjustable bodies of easily magnetizable material, which are mounted on the tube 14 containing the sensors A and B.

Figure 2:
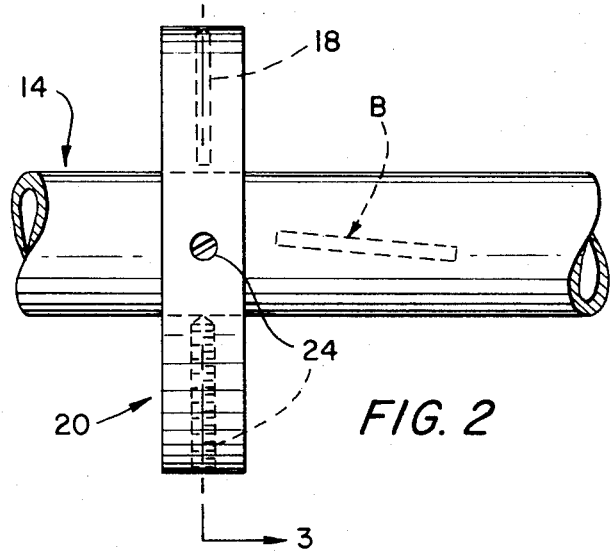
FIG. 2 is an enlarged fragmentary plan view illustrating the compensating means in greater detail.
Figure 3:
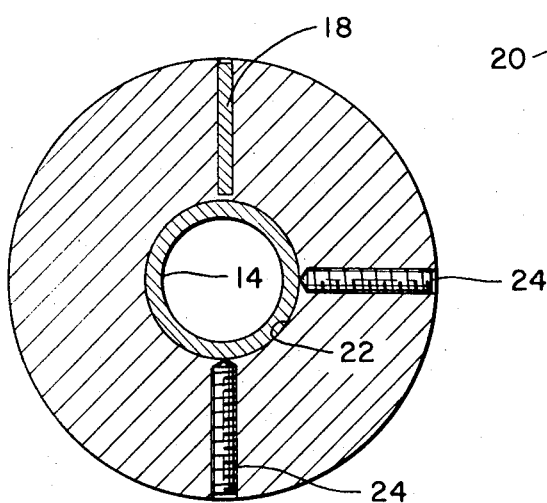
FIG. 3 is a transverse sectional view taken along line 3—3 of FIG. 2.

As shown in FIGS. 1–3, in elongated rod or slug 18 of easily magnetizable material, such as Permalloy, is carried radially by a member 20 mounted upon the support tube 14. Member 20 may be in the form of an annulus having a center opening 22 which permits the annulus to be slidably engaged over the tube 14 for adjustment along the length of the tube and also circumferentially of the tube. As shown in FIG. 2, the annulus may be placed adjacent to one of the cores, such as the core of sensor B, which is misaligned relative to the axis of the tube 14, the misalignment being exaggerated in FIG. 2 for purposes of illustration. One or more set screws 24 permit the annulus 20 to be fixed in position upon tube 14 when the proper position for optimal compensation is determined.

To adjust the compensating mechanism of the invention, the apparatus 10 may be placed in a fixture ( not shown ) so that it can be rotated about the axis of tube 14 in an ambient magnetic field perpendicular to that axis. If the axes of the sensor cores are not precisely aligned with or parallel to the axis of tube 14, a signal will be generated when the assembly is turned about the axis of the tube. The annulus 20 is adjusted longitudinally of the tube 14 and circumferentially of the tube until this signal is minimized, and then the annulus is fixed upon the tube by means of the set screws 24.

Figure 4:
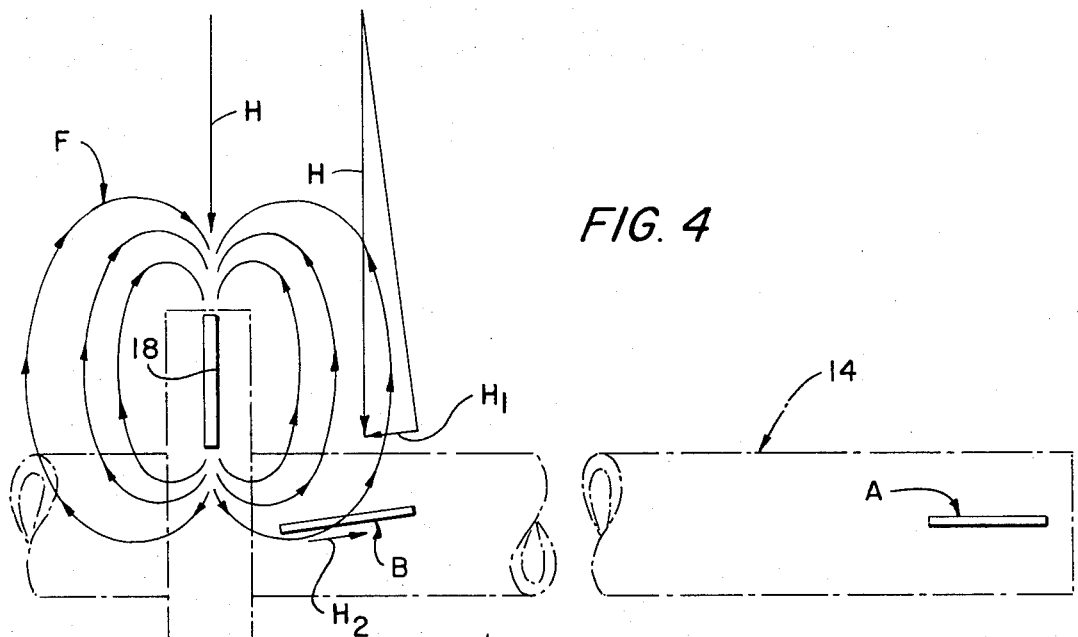
FIGS. 4 and 5 are diagrammatic views illustrating the operation of the compensating means.
Figure 5:
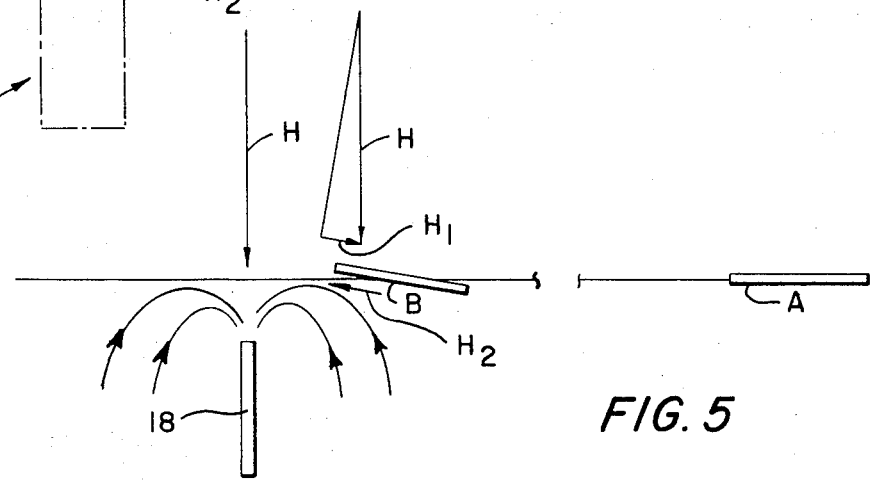

The theoretical basis for the compensation obtained is illustrated in FIGS. 4 and 5. In FIG. 4 the core of sensor B is shown misaligned with the longitudinal axis of the support tube 14 ( illustrated in phantom lines ). The ambient magnetic field vector H is shown perpendicular to the axis of the tube. Due to the misalignment of the core, there will be an ambient magnetic field vector $H_1$ parallel with the axis of the core, which will produce a signal in the core pick-up winding. The magnetic field H also acts on the magnetic body 18 so as to produce external magnetic lines of force having the directions indicated by arrows on the lines F. This external field has a component $H_2$ parallel with the core of sensor B. The position of the annulus 20 ( also shown in phantom lines ) is adjusted so that $H_2$ is equal in magnitude to $H_1$. Thus, the field induced in slug 18 by the ambient field perpendicular to the axis of the tube 14 produces the compensation. FIG. 5 shows the condition when the whole assembly is rotated 180°. It can be seen that the compensation is still provided, because $H_1$ and $H_2$ both reverse their direction when the assembly is turned 180°.

Figure 7:
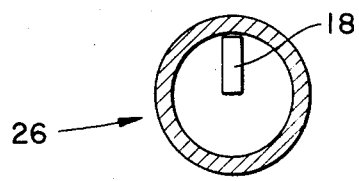
FIG. 7 is an end view of the compensating means employed in the embodiment of FIG. 6.
Figure 6:
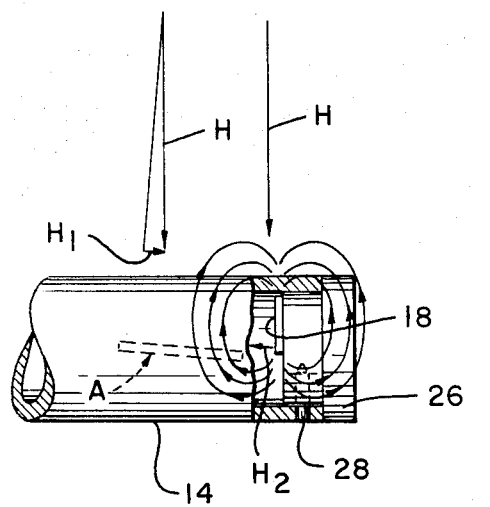
FIG. 6 is a fragmentary plan view, partially broken away, illustrating a further embodiment of the invention.

FIGS. 6 and 7 illustrate a modification of the invention in which the magnetic body 18 is supported eccentrically ( radially ) upon an end cap 26 of the tube 14. The end cap may be undercut so as to fit within the end of the tube as shown in FIG. 6. Cap 26 may be formed of aluminum or plastic, for example, and the slug 18 may be cemented thereto. The end cap is rotated about the axis of the tube until the best compensation is achieved; then a pin 28 is inserted through a bore formed in the wall of the tube and the end cap in order to fix the end cap in position upon the tube. The compensation achieved by the embodiment of FIGS. 6 and 7 is not as flexible as in the previously described embodiment, because the slug 18 cannot be moved along the length of the tube 14, but it has the advantage of avoiding protuberances upon the tube 14. It is of course desired to obtain sufficient compensation to reduce the error signal below the dead zone of the instrument. If sufficient compensation is not obtained, the size of the magnetic body can be changed. Both embodiments described herein can provide adequate compensation without any internal modification of the magnetic sensing apparatus.

While preferred embodiments of the invention have been shown and described, it will be apparent to those skilled in the art that changes can be made in these embodiments without departing from the principles and spirit of the invention, the scope of which is defined in the appended claims.

The invention claimed is:

1. Magnetic sensing apparatus comprising an elongated non-magnetic cylindrical tube, a pair of directional magnetic field sensor means spaced apart in and fixed to said tube, said sensor means having individual magnetic axes approximately aligned with the longitudinal axis of said tube, and means for compensating for misalignment of the axis of either of said sensor means in said longitudinal axis, said compensating means comprising a non-magnetic annulus having an opening through which said elongated tube extends freely and slidably longitudinally and circumferentially, said annulus carrying a body of easily magnetizable material and having mechanically adjustable means for fixing the annulus to said tube after said annulus has been moved longitudinally along said tube and circumferentially of said tube to a position at which substantial compensation for misalignment is attained.

2. Apparatus in accordance with claim 1, wherein said body comprises a rod extending radially of said annulus to the vicinity of said tube.

3. Apparatus in accordance with claim 1, wherein said mechanically adjustable means comprises a set screw.

4. Magnetic sensing apparatus comprising an elongated non-magnetic cylindrical tube, a pair of directional magnetic field sensor means spaced apart in and fixed to said tube, said sensor means having individual magnetic axes approximately aligned with the longitudinal axis of said tube, and means for compensating for misalignment of the axis of either of said sensor means with said longitudinal axis, said compensating means comprising a non-magnetic cylindrical cap closing one end of said tube and rotatably adjustable about said longitudinal axis, said cap carrying a body of easily magnetizable material eccentrically thereon and having means for fixing the cap to the tube after the cap has been rotated about said longitudinal axis to a position at which substantial compensation for misalignment is attained.

5. Apparatus in accordance with claim 4, wherein said cap fits within said one end of said tube.

6. Apparatus in accordance with claim 5, wherein said means for fixing said cap to said tube comprises a pin extending from said cap to said tube.

* * * * *